(12) United States Patent  
Tomikawa

(10) Patent No.: US 8,081,274 B2  
(45) Date of Patent: Dec. 20, 2011

(54) LIQUID CRYSTAL DEVICE HAVING A FIRST POLARIZING ELEMENT DEVIATED UP TO A RANGE OF PLUS OR MINUS 1 DEGREE RELATIVE TO A Y AXIS OF A SECOND POLARIZING ELEMENT

(75) Inventor: Naoki Tomikawa, Chino (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 12/122,317

(22) Filed: May 16, 2008

(65) Prior Publication Data

US 2009/0009704 A1 Jan. 8, 2009

(30) Foreign Application Priority Data

Jul. 4, 2007 (JP) ................................. 2007-175882

(51) Int. Cl.
*G02F 1/1335* (2006.01)
*G02F 1/1343* (2006.01)

(52) U.S. Cl. ......................................... 349/96; 349/141

(58) Field of Classification Search ............ 349/96–103, 349/141

See application file for complete search history.

(56) References Cited

U.S. PATENT DOCUMENTS 5,928,733 A * 7/1999 Yoneya et al. ................. 428/1.3

| 6,111,627 | A* | 8/2000 | Kim et al. ..................... 349/141 |
| 6,507,383 | B1* | 1/2003 | Abe et al. ...................... 349/141 |
| 2007/0200977 | A1* | 8/2007 | Egi et al. ......................... 349/96 |

FOREIGN PATENT DOCUMENTS

| JP | 10-170923 A | 6/1998 |
| JP | 11-202356 A | 7/1999 |
| JP | 2001-125092 A | 5/2001 |

* cited by examiner

*Primary Examiner* — Mark Robinson
*Assistant Examiner* — Paul Lee
(74) *Attorney, Agent, or Firm* — K&L Gates LLP

(57) ABSTRACT

A liquid crystal device includes a first substrate and a second substrate that are disposed to face each other, a first electrode and a second electrode that are disposed on a surface, which faces the second substrate, of the first substrate, a liquid crystal layer that is disposed between the first substrate and the second substrate and has liquid crystal molecules aligned in a direction parallel to the first substrate, and a pair of polarizing elements having the liquid crystal layer interposed therebetween. The liquid crystal molecules are driven by an electric field that is generated by an electric potential difference between the first electrode and the second electrode and has a component parallel to the first substrate, and the retardation of the liquid crystal layer is equal to or larger than 0.66 λ and is equal to or smaller than 0.83 λ for light having a wavelength λ of 555 nm.

9 Claims, 11 Drawing Sheets

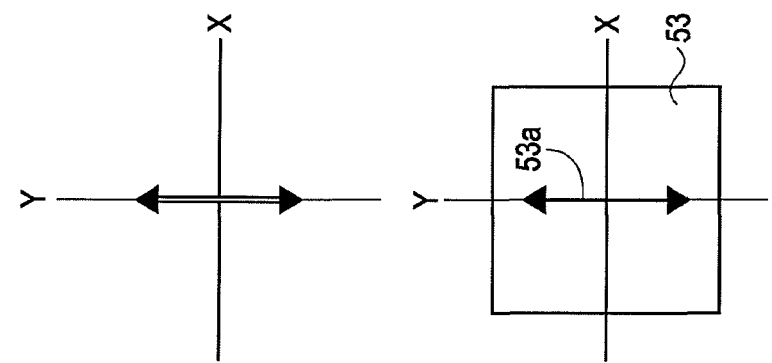
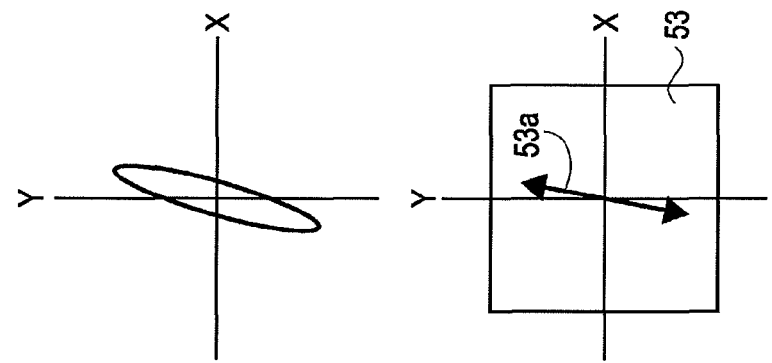
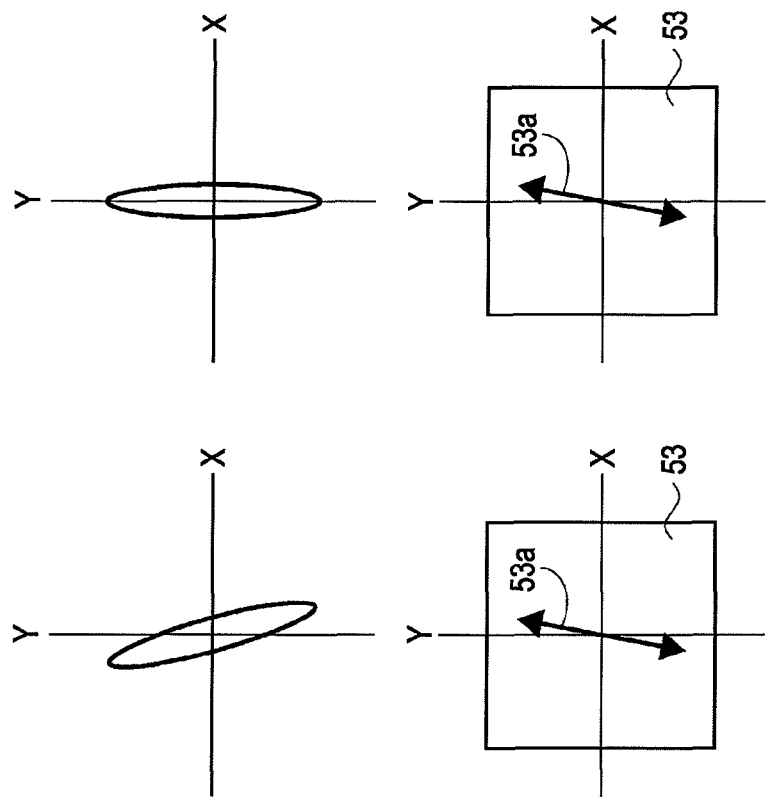

LIQUID CRYSTAL DEVICE HAVING A FIRST POLARIZING ELEMENT DEVIATED UP TO A RANGE OF PLUS OR MINUS 1 DEGREE RELATIVE TO A Y AXIS OF A SECOND POLARIZING ELEMENT

RELATED APPLICATIONS

The present application is based on, and claims priority from, Japan Application Number 2007-175882, filed Jul. 4, 2007, the disclosure of which is hereby incorporated by reference herein in its entirety.

BACKGROUND

1. Technical Field

The present invention relates to a liquid crystal device and an electronic apparatus in which the liquid crystal device is built.

2. Related Art

As modes of liquid crystal devices, there are modes referred to as an FFS (fringe field switching) mode and an IPS (in plane switching) mode that drive liquid crystal molecules by a horizontal electric field (an electric field parallel to the substrate). In these liquid crystal devices, normally-black display is generally performed by disposing the liquid crystal molecules parallel to the substrate and aligning transmission axes of a pair of polarizing plates having the substrate interposed therebetween parallel or perpendicular to rubbing axis (the alignment direction of the liquid crystal molecules in the absence of an applied voltage). In such a case, it is known that the leakage of light in black display increases as direction of the axis of the polarizing plate is deviated from the optimal direction and thus the contrast decreases. Here, the degree of the decrease in the contrast depends on whether the direction of transmission axis of the polarizing plate is deviated from the optimal direction in the positive direction or in the negative direction. In other words, when the transmission axis is deviated in a direction in which the contrast changes slowly, the decrease in the contrast is small. However, when the transmission axis is deviated in a direction in which the contrast changes rapidly, the contrast decreases markedly.

As one of methods of suppressing the decrease in the contrast, a method of improving the precision of bonding positions of the polarizing plates has been known. In JP-A-2001-125092, technology for improving the precision of the bonding positions of the polarizing plates by disposing alignment marks in the polarizing plates and a liquid crystal panel is disclosed.

However, even when the above-described technology is used, an error between the transmission axis of the polarizing plate and the position of the alignment mark and a mechanical error in a process for bonding the polarizing plate are not completely removed. Thus, the decrease in the contrast due to deviation of the angle of the transmission axis of the polarizing plate is not completely prevented. Particularly, in a case where the angle of the transmission axis is deviated in a direction in which the contrast changes rapidly, the contrast decreases markedly. Accordingly, technology for making the dependence of the contrast change on the direction of the deviation of the transmission axis to be small, that is, technology for realizing smaller difference in rapidity of the contrast change which depends on the above-described deviated direction has been demanded.

SUMMARY

An advantage of some aspects of the invention is that it provides a liquid crystal device and an electronic apparatus having the liquid crystal device.

The invention can be embodied as the following forms or applied examples.

According to a first aspect of the invention, there is provided a liquid crystal device including: a first substrate and a second substrate that are disposed to face each other; a first electrode and a second electrode that are disposed on a surface, which faces the second substrate, of the first substrate; a liquid crystal layer that is disposed between the first substrate and the second substrate and has liquid crystal molecules aligned in a direction parallel to the first substrate; and a pair of polarizing elements having the liquid crystal layer interposed therebetween. The liquid crystal molecules are driven by an electric field that is generated by an electric potential difference between the first electrode and the second electrode and has a component parallel to the first substrate, and the retardation of the liquid crystal layer is equal to or larger than $0.66\lambda$ and is equal to or smaller than $0.83\lambda$ for light having a wavelength $\lambda$ of 555 nm.

According to the aspect above, the incident light to the liquid crystal device becomes almost elliptical polarized light having its major axis parallel to or perpendicular to the alignment direction of the liquid crystal molecules when the light has passed the liquid crystal layer and the polarizing element which is disposed on one side of the liquid crystal layer. Thus, the dependence of the contrast change, which is caused by the deviation of the transmission axis of another polarizing element from the alignment direction (or a direction perpendicular thereto) of the liquid crystal molecules, on whether the deviation is in the positive direction or in the negative direction becomes smaller. Accordingly, an irregular property of the liquid crystal device that is caused by the irregularity of the angle of the transmission axis of the polarizing element can be reduced. Here, the retardation of the liquid crystal layer is defined as a value acquired from multiplying the refractive anisotropy $\Delta n$ by the thickness d of the liquid crystal layer.

According to a second aspect of the invention, in the above-described liquid crystal device, the retardation of the liquid crystal layer is equal to or larger than $0.70\lambda$ and is equal to or smaller than $0.77\lambda$ for light having a wavelength $\lambda$ of 555 nm.

According to the aspect above, the incident light to the liquid crystal device is approximately identical to elliptical polarized light having its major axis parallel to or perpendicular to the alignment direction of the liquid crystal molecules when the light has passed the liquid crystal layer and the polarizing element which is disposed on one side of the liquid crystal layer. Thus, the dependence of the contrast change, which is caused by the deviation of the transmission axis of another polarizing element from the alignment direction (or a direction perpendicular thereto) of the liquid crystal molecules, on whether the deviation is in the positive direction or in the negative direction becomes really small. Accordingly, an irregular property of the liquid crystal device that is caused by the irregularity of the angle of the transmission axis of the polarizing element can be reduced.

According to a third aspect of the invention, in the above-described liquid crystal device, the retardation of the liquid crystal layer is $0.75\lambda$ for light having a wavelength $\lambda$ of 555 nm.

According to the aspect above, the incident light to the liquid crystal device is approximately identical to elliptical polarized light having its major axis parallel to or perpendicular to the alignment direction of the liquid crystal molecules when the light has passed the liquid crystal layer and the polarizing element which is disposed on one side of the liquid crystal layer. Thus, the contrast change, which is caused by the deviation of the transmission axis of another polarizing element from the alignment direction (or a direction perpendicular thereto) of the liquid crystal molecules, does not depend on whether the deviation is in the positive direction or in the negative direction. Accordingly, an irregular property of the liquid crystal device that is caused by the irregularity of the angle of the transmission axis of the polarizing element can be reduced.

According to a fourth aspect of the invention, in the above-described liquid crystal device, the first electrode is formed in a layer disposed between the first substrate and the second electrode, and a plurality of slits is formed in the second electrode.

According to the aspect above, an FFS-mode liquid crystal device having a reduced irregular property that is caused by the irregularity of the angle of the transmission axis of the polarizing plate is realized.

According to a fifth aspect of the invention, in the above-described liquid crystal device, the first electrode and the second electrode have portions forming comb-teeth shapes, are formed in a same layer, and are disposed to face each other such that the portions forming the comb-teeth shapes are alternately disposed.

According to the aspect above, an IPS-mode liquid crystal device having a reduced irregular property that is caused by the irregularity of the angle of the transmission axis of the polarizing plate is realized.

According to a sixth aspect of the invention, there is provided an electronic apparatus including the above-described liquid crystal device.

According to the aspect above, an electronic apparatus having a reduced irregular property for display using the liquid crystal device is realized.

BRIEF DESCRIPTION OF THE DRAWINGS

The invention will be described with reference to the accompanying drawings, wherein like numbers reference like elements.

FIG. 1A is a perspective view of the liquid crystal device. FIG. 1B is a cross-sectional view of FIG. 1A taken along line IB-IB.

FIGS. 7A, 7B, 7C, and 7D are diagrams showing a relationship between the direction of the transmission axis of the polarizing plate and the polarization state of light after passing through a liquid crystal layer of the liquid crystal device.

DESCRIPTION OF EXEMPLARY EMBODIMENTS

Figure 1A:
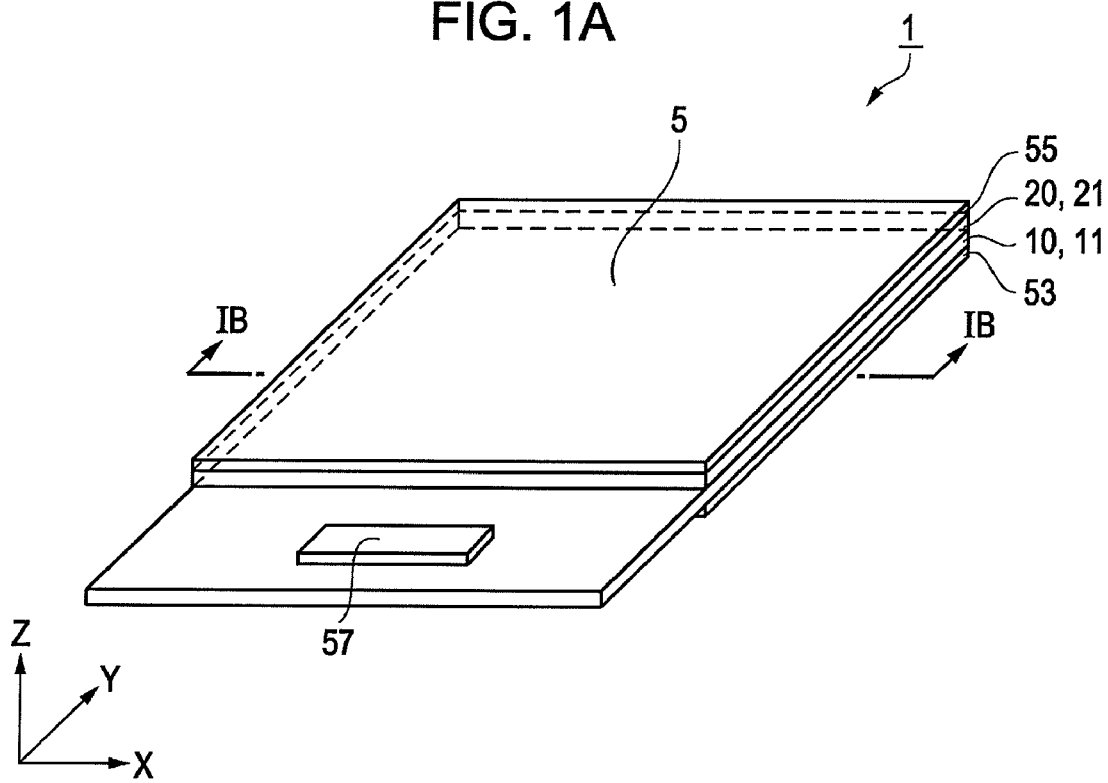
FIGS. 1A and 1B are schematic diagrams of a liquid crystal device according to an embodiment of the invention.

Hereinafter, a liquid crystal device and an electronic apparatus according to embodiments of the present invention will be described with reference to the accompanying drawings. In the drawings below, the scale or the ratio of each constituent element is appropriately represented which is different from its actual size for resizing each constituent element to be recognizable in the drawings.

First Embodiment

A. Configuration of Liquid Crystal Device

Figure 1B:
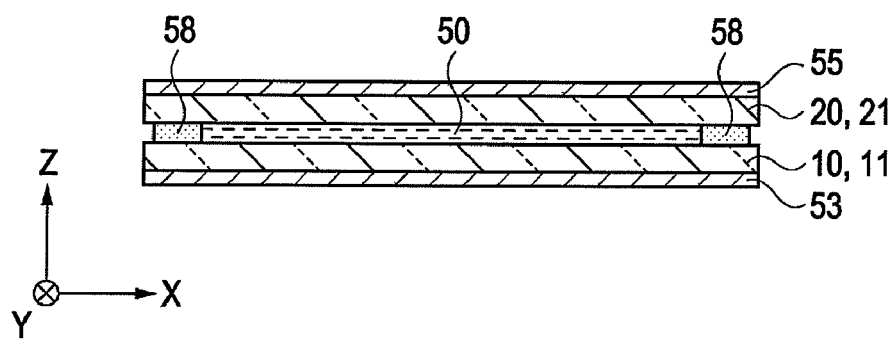

FIGS. 1A and 1B are schematic diagrams of a liquid crystal device 1 according to an embodiment of the invention. FIG. 1A is a perspective view of the liquid crystal device. FIG. 1B is a cross-sectional view of FIG. 1A taken along line IB-IB. The liquid crystal device 1 has a component substrate 10 and an opposing substrate 20 that are bonded together to be disposed to face each other through a frame-shaped sealing material 58. In the component substrate 10, a glass substrate 11 as a first substrate is included. In addition, in the opposing substrate 20, a glass substrate 21 as a second substrate is included. In a space surrounded by the component substrate 10, the opposing substrate 20, and the sealing material 58, a liquid crystal layer 50 including liquid crystal molecules 51 (FIG. 5) is disposed. The component substrate 10 is larger than the opposing substrate 20, and the component substrate 10 is bonded to the opposing substrate in a state that a part of the component substrate 10 protrudes from the opposing substrate 20. In the protruded portion, a driver IC 57 used for driving the liquid crystal 50 layer is mounted. In addition, the liquid crystal device 1 has polarizing plates 53 and 55 as a pair of polarizing elements disposed to face each other through the liquid crystal layer 50. In this embodiment, the polarizing plate 53 is bonded to the outer side of the component substrate 10, and the polarizing plate 55 is bonded to the outer side of the opposing substrate 20.

In the area in which the liquid crystal layer 50 is sealed, a plurality of sub pixels 4R, 4G, and 4B (FIG. 2) is disposed in the shape of a matrix. Hereinafter, an area including a set of the sub pixels 4R, 4G, and 4B may be referred to as a pixel area 5.

Figure 2:
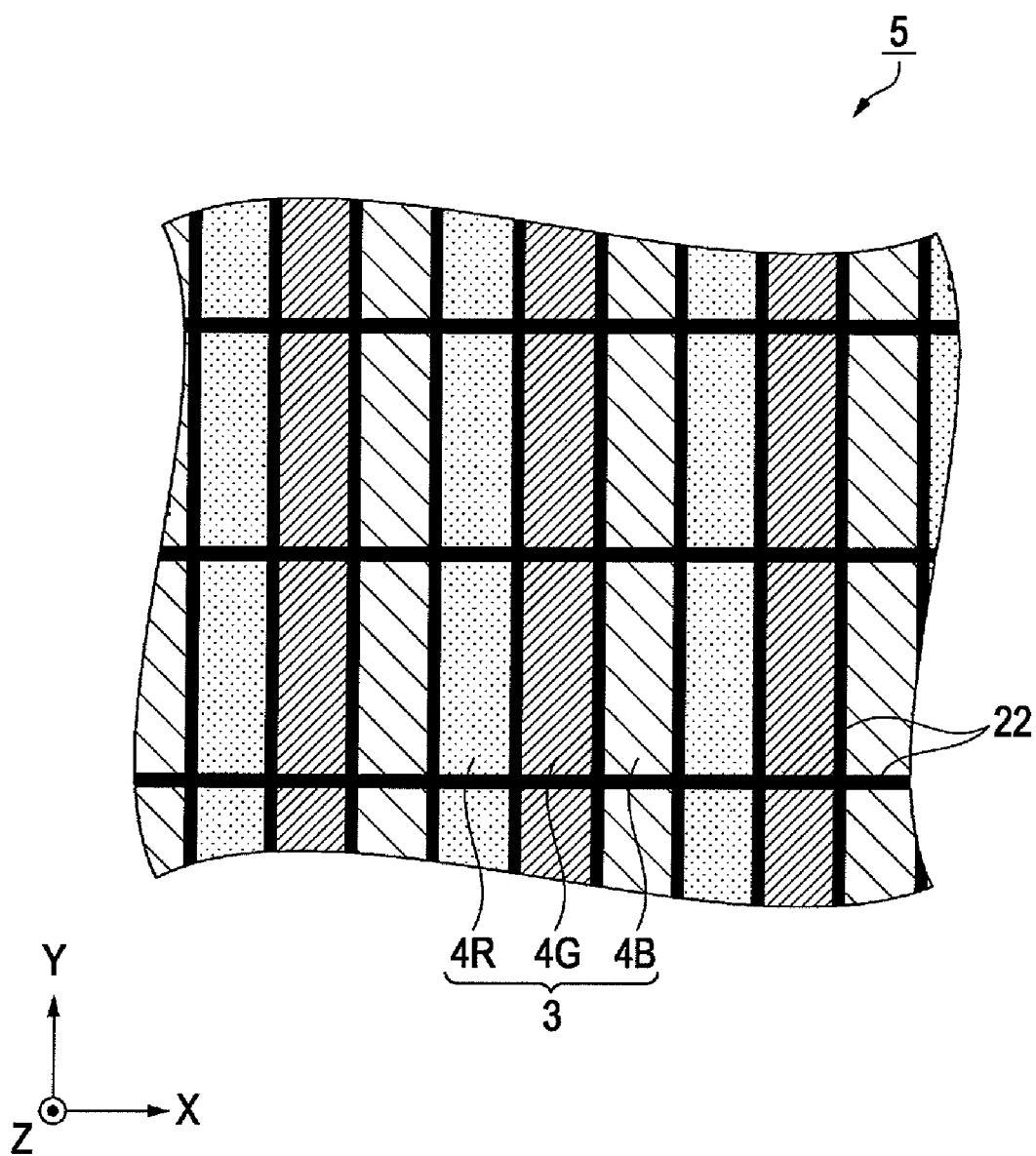
FIG. 2 is an enlarged plan view of a pixel area of the liquid crystal device.

FIG. 2 is an enlarged plan view of the pixel area 5. In the pixel area 5, a plurality of sub pixels 4R, 4G, and 4B having a rectangular shape is disposed. Each one of the sub pixels 4R, 4G, and 4B contributes to displaying one color from among red, green, and blue colors. Hereinafter, the sub pixels 4R, 4G, and 4B will be simply referred to as sub pixels 4 when the colors are not distinguished. In the sub pixels 4R, 4G, and 4B, color filters 23 (FIG. 5) corresponding to red, green, and blue colors are disposed. Each of the color filters 23 can form the color of transmitted light to be a specific color by absorbing a specific wavelength component of incident light. Between adjacent sub pixels 4, a light shielding layer 22 is disposed in a same layer as the color filter 23.

The sub pixels 4 are disposed in the shape of a matrix, and colors of sub pixels 4 disposed in a specific column are the same. In other words, the sub pixels 4 are disposed such that corresponding colors are arranged in the shape of stripes. A set of three adjacent sub pixels 4R, 4G, and 4B aligned in the row direction forms a pixel 3. The pixel 3 becomes a minimum unit (pixel) of display. The liquid crystal device 1 can display various colors by adjusting luminance balance of the sub pixels 4R, 4G, and 4B in each pixel 3.

Figure 3:
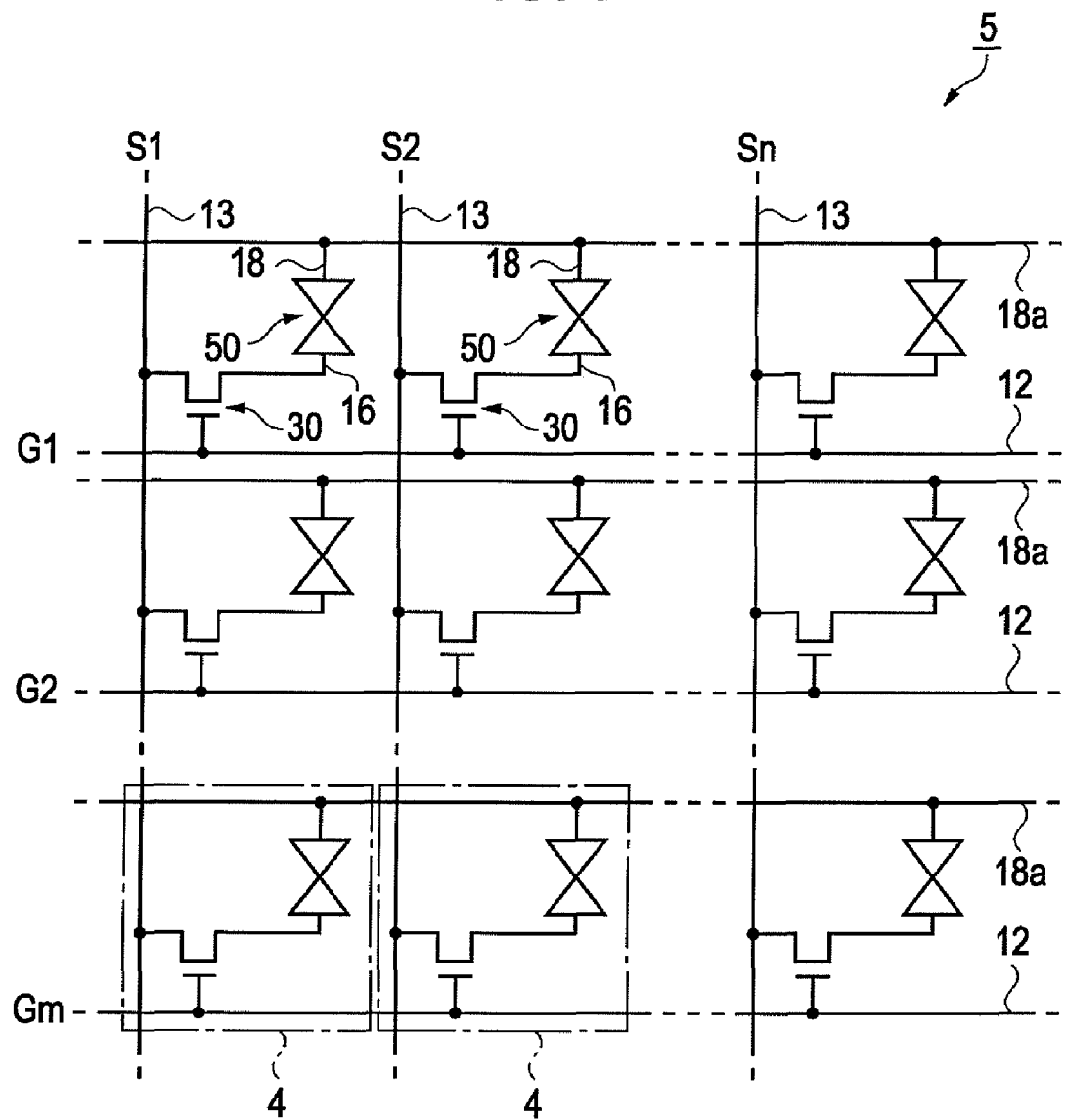
FIG. 3 is an equivalent circuit diagram for components, wirings, and the like of a plurality of the sub pixels that constitute the pixel area.

FIG. 3 is an equivalent circuit diagram for components, wirings, and the like of a plurality of the sub pixels 4 that constitute the pixel area 5. In the pixel area 5, a plurality of scanning lines 12 and a plurality of data lines 13 are wired so as to intersect each other. In addition, sub pixels 4 each including a TFT (thin film transistor) element 30 and a pixel electrode 16 serving as a second electrode are formed in correspondence with the intersections between the scanning lines 12 and the data lines 13. The pixel electrode 16 is electrically connected to a drain area of the TFT element 30. In addition, in the sub pixel 4, a common electrode 18 serving as a first electrode is disposed. A same electric potential level is maintained in the common electrodes 18 through a common line 18a.

The TFT elements 30 are turned on in accordance with ON signals included in scanning signals G1, G2, . . . , Gm that are supplied from the scanning lines 12. At that moment, the TFT elements 30 supply image signals S1, S2, . . . , Sn supplied to the data lines 13 to the pixel electrodes 16. When an electric field generated by an electric potential difference between the pixel electrode 16 and the common electrode 18 is applied to the liquid crystal layer 50, the aligning state of the liquid crystal layer 50 changes. The liquid crystal device 1 performs a display operation by modulating incident light from the component substrate side 10 by using a polarization conversion function corresponding to the aligning state of the liquid crystal layer 50 and a polarization selection function of the polarizing plates 53 and 55 and outputting the modulated light from the opposing substrate 20 side.

Figure 4:
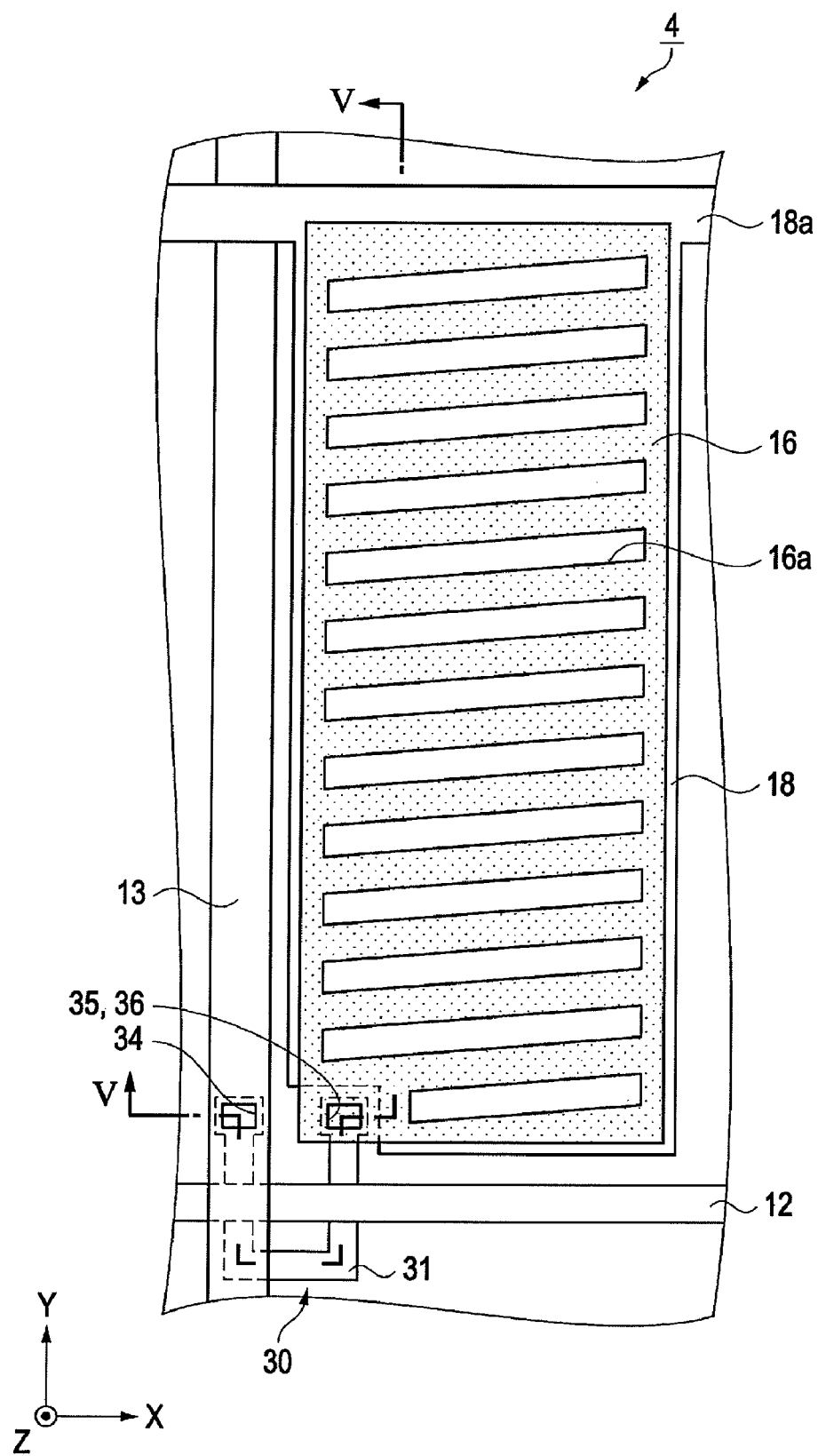
FIG. 4 is a plan view of a portion corresponding to one sub pixel which is extracted from a component substrate of the liquid crystal device.
Figure 5:
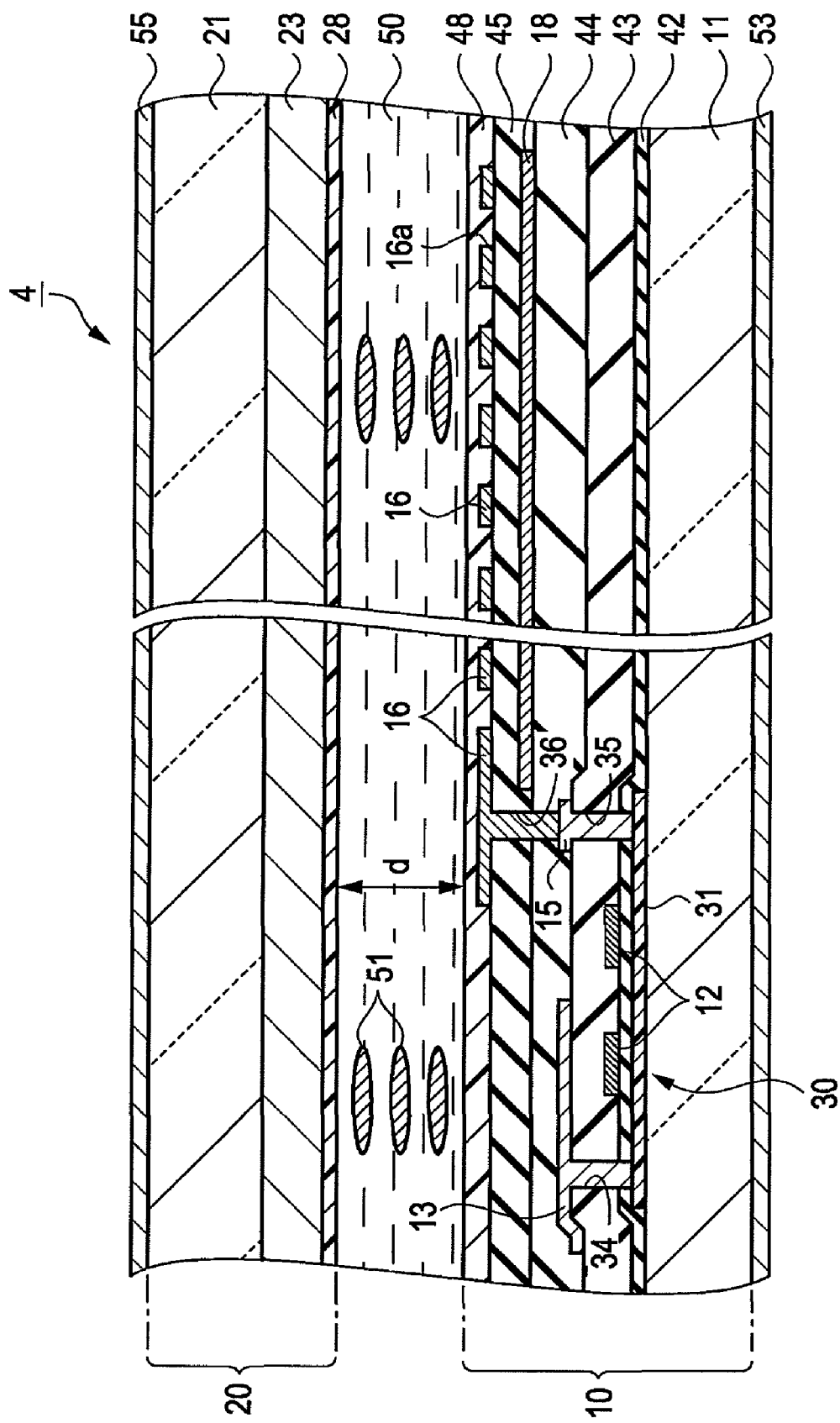
FIG. 5 is a cross-sectional view of FIG. 4 taken along line V-V.

Next, constituent elements of the sub pixel 4 will be described in detail with reference to FIGS. 4 and 5. FIG. 4 is a plan view of a portion corresponding to one sub pixel 4 which is extracted from the component substrate 10. FIG. 5 is a cross-sectional view of FIG. 4 taken along line V-V. In descriptions below, an upper layer and a lower layer indicate a layer disposed in a relatively upper position and a layer disposed in a relatively lower position in FIG. 5.

As shown in FIG. 4, in each sub pixel 4, the scanning line 12 and the data line 13 are disposed to intersect each other, and the TFT element 30 is formed in correspondence with the intersection. To the TFT element 30, the pixel electrode 16 having an approximately rectangular shape is electrically connected. In the pixel electrode 16, a plurality of parallel slits (opening portions) 16a is disposed to have a same gap therebetween. Each slit 16a forms a rectangle or a parallelogram that is thin and long, and a longer side thereof is tilted at a predetermined angle with respect to the X-axis direction. In this embodiment, the angle is set to 5 degrees. On the lower layer side of the pixel electrode 16, the common electrode 18 is formed. The common electrode 18 is formed in a position to be overlapped with the pixel electrode 16, viewed from the +Z direction.

As shown in FIG. 5, on a surface, which faces the glass substrate 21, of the glass substrate 11, a semiconductor layer 31 is laminated. The semiconductor layer 31, for example, may be formed as a poly silicon layer. The semiconductor layer 31 includes a channel area serving as a gate electrode in which a channel is formed by an electric field from the scanning line 12 and source and drain areas having the channel area interposed therebetween. In addition, in order to decrease a leakage current, it is preferable that the semiconductor layer 31 is configured to have an LDD (lightly doped drain) structure in which a low-density area is provided in a part of the source and drain areas. In addition, between the semiconductor layer 31 and the glass substrate 11, a base insulation film, a light shielding layer, or the like may be formed.

In an upper layer of the semiconductor layer 31, the scanning line 12 formed of a high melting point metal such as titanium, chrome, tungsten, tantalum, or molybdenum, an alloy containing the above-described metal, or the like is laminated with a gate insulation film 42 made of a silicon oxide or the like interposed therebetween. The TFT element 30 is constituted by the semiconductor layer 31, the gate insulation film 42, the scanning line 12, and the like. The semiconductor layer 31 according to this embodiment forms a letter "U" shape, viewed from the direction (+Z direction) of a normal line of the glass substrate 11. The scanning line 12 is formed in a direction for traversing the letter "U" of the semiconductor layer 31. Consequently, the TFT element 30 has a double gate structure in which the scanning line 12 and the semiconductor layer 31 face each other in two different spots. Accordingly, unnecessary leakage current can be decreased. The TFT element 30 may be formed to have a triple gate structure or a single gate structure. In addition, the configuration of the TFT element 30 is not limited to the above-described top gate structure, and the TFT element 30 may be configured to have a bottom gate structure or formed by using amorphous silicon as is required.

In an upper layer of the scanning line 12, the data line 13 is laminated with the interlayer insulation film 43 made of a silicon oxide or the like interposed therebetween. The data line 13 is formed of metal such as aluminum, chrome, tungsten, or the like, an alloy containing the above-described metal, or the like and has a light shielding property. The data line 13, as shown in FIG. 4, is disposed to be perpendicular to the scanning line 12 and is electrically connected to the semiconductor layer 31 in the front end of the letter "U" shape of the semiconductor layer 31 on one side. In particular, the data line 13 is connected to the source area of the semiconductor layer 31 through a contact hole 34 that is formed by perforating the gate insulation film 42 and the interlayer insulation film 43.

In the layer in which the data line 13 is formed, a relay electrode 15 made of a same material as that of the data line 13 is formed. The relay electrode 15 is electrically connected to the drain area of the semiconductor layer 31 through a contact hole 35 that is formed by perforating the gate insulation film 42 and the interlayer insulation film 43 in the front end of the letter "U" shape of the semiconductor layer 31 on the other side.

In an upper layer of the data line 13 and the relay electrode 15, the common electrode 18 formed of ITO (indium tin oxide) having translucency is laminated with the interlayer insulation film 44 formed of a silicon oxide or the like interposed therebetween.

In an upper layer of the common electrode 18, the pixel electrode 16 that is formed of ITO and has translucency is formed with the interlayer insulation film 45 serving as an insulation layer interposed therebetween. The interlayer insulation film 45, for example, may be formed of a silicon oxide. The pixel electrodes 16 for each sub pixel 4 are provided to be independent from each other. The pixel electrode 16 is electrically connected to the relay electrode 15 through a contact hole 36 that is formed by perforating the interlayer insulation films 44 and 45. As a result, the pixel electrode 16 is electrically connected to the drain area of the semiconductor layer 31 through the relay electrode 15. In the pixel electrode 16, as described above, a plurality of slits 16a is disposed. Here, the pixel electrode 16, the common electrode 18, and the interlayer insulation film 45 interposed therebetween also serve as a storage capacitor.

While the common electrode 18 is maintained at a constant electric potential, an image signal is recorded in the pixel electrode 16 through the data line 13 and the TFT element 30, and accordingly, a drive voltage corresponding to the magnitude of the image signal is applied between the common electrode 18 and the pixel electrode 16. The drive voltage is set between an OFF voltage corresponding to black display and an ON voltage corresponding to white display. Hereinafter, a state that the OFF voltage is applied between the common electrode 18 and the pixel electrode 16 is referred to as an OFF state, and a state that the ON voltage is applied between the common electrode 18 and the pixel electrode 16 is referred to as an ON state.

On the common electrode 18, the alignment film 48 formed of polyimide is laminated. The alignment film 48 is a member that is brought into contact with the liquid crystal layer 50. By rubbing the alignment film 48, liquid crystal molecules 51 of the liquid crystal layer 50 can be aligned along the rubbing direction. In this embodiment, the alignment film 48 is rubbed parallel to the extending direction of the scanning line 12 toward a negative direction of the X-axis (FIG. 4). The component substrate 10 includes from the glass substrate 11 to the alignment film 48 which have been described above as its constituent elements.

On the other hand, on the surface, which faces the glass substrate 11, of the glass substrate 21, the color filter 23 and the alignment film 28 are laminated in the mentioned order. To be described in detail, in the layer in which the color filters 23 are formed, the color filters 23 of three types corresponding to red, green, and blue colors and light shielding layers 22 (FIG. 2) disposed between the color filters 23 of each color are formed. The alignment film 28 is formed of polyimide and has a same property as the alignment film 48 of the component substrate 10 side. In this embodiment, the alignment film 28 is rubbed parallel to the extending direction of the scanning line 12 toward the positive direction of the X-axis (FIG. 4). The opposing substrate 20 includes from the glass substrate 21 to the alignment film 28 as its constituent elements.

In an area between the component substrate 10 and the opposing substrate 20, that is, an area interposed between the alignment film 28 and the alignment film 48, the liquid crystal layer 50 having the liquid crystal molecules 51 is disposed. The refractive anisotropy Δn of the liquid crystal molecules 51 is 0.10. In addition, in this embodiment, the thickness d of the liquid crystal layer 50 is set to be 3.7 μm. Consequently, the retardation of the liquid crystal layer 50 which is defined by a value acquired from multiplying the refractive anisotropy Δn by the thickness d is 0.37 μm.

To the outer sides of the component substrate 10 and the opposing substrate 20, the polarizing plates 53 and 55 are bonded. The polarizing plates 53 and 55 are optical elements that allow linearly polarized light having a polarization axis parallel to the transmission axis to pass through. As the polarizing plates 53 and 55, for example, an absorption-type polarizing plate that is produced by stretching polyvinyl alcohol in which iodine is absorbed may be used. In the absorption-type polarizing plate, the transmission axis is in a direction perpendicular to the stretching direction. As the polarizing plates 53 and 55, any type of an element having a polarization selecting function such as a reflection-type polarizing plate, or a wire grid polarizer other than the absorption-type polarizing plate may be used.

On the lower side of the polarizing plate 53, a light source (not shown) such as a back light is appropriately disposed. The light from the back light passes through the polarizing plate 53, the component substrate 10, the liquid crystal layer 50, the opposing substrate 20, and the polarizing plate 55 while being converted in polarization and modulated, and thereby the light contributes to display.

Figure 6:
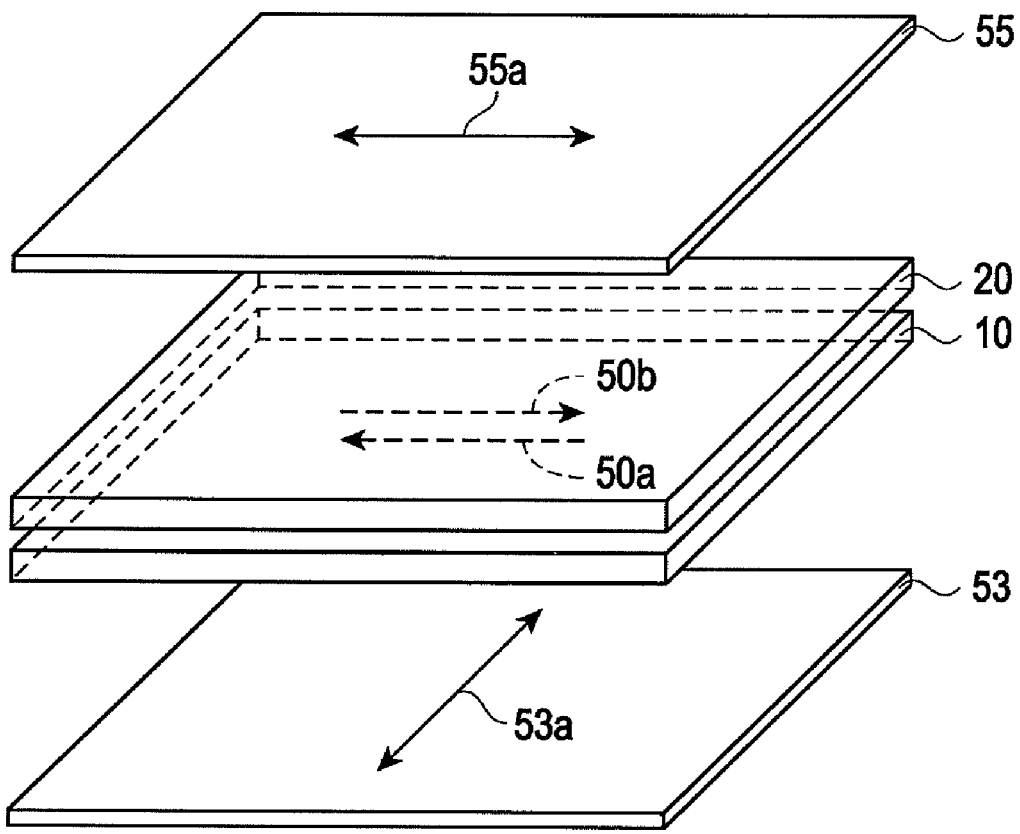
FIG. 6 is a schematic diagram showing transmission axes of polarizing plates and the rubbing directions of the liquid crystal device.

FIG. 6 is a schematic diagram showing transmission axes 53a and 55a of the polarizing plates 53 and 55, the rubbing direction 50a of the alignment film 48, and the rubbing direction 50b of the alignment film 28. Here, the transmission axis 53a is configured to be parallel to the Y-axis in the figure, and the transmission axis 55a is configured to be parallel to the X-axis in the figure. Accordingly, the transmission axes 53a and 55a are orthogonal to each other.

In addition, the rubbing direction 50a of the alignment film 48 formed on the component substrate 10 is configured to be the −X direction, and the rubbing direction 50b of the alignment film 28 formed on the opposing substrate 20 is configured to be the +X direction. As a result, the rubbing directions 50a and 50b are parallel to each other. In addition, directions 50a and 50b are perpendicular to the transmission axis 53a and parallel to the transmission axis 55a.

The liquid crystal molecules 51 of the liquid crystal layer 50 are aligned along the rubbing directions 50a and 50b in the absence of an applied voltage or in an OFF state. Since the rubbing directions 50a and 50b are parallel and opposite to each other, the liquid crystal layer 50 is arranged in so-called anti-parallel alignment. The liquid crystal molecules 51 of the liquid crystal layer 50 are aligned to be parallel to the glass substrate 11 regardless of the magnitude (the strength of the electric field) of the drive voltage.

Hereinafter, the above-described configuration, that is, a configuration in which the transmission axis 55a and the rubbing directions 50a and 50b are parallel to each other and perpendicular to the transmission axis 53a will be also referred to as optimal disposition.

A configuration in which the rubbing directions 50a and 50b are parallel to the transmission axis 53a of the polarizing plate 53 and perpendicular to the transmission axis 55a of the polarizing plate 55 may be used. When such a configuration is used, display can be performed by a same optical operation as that in the above-described embodiment.

B. Operation of Liquid Crystal Device

Subsequently, the operation of the liquid crystal device 1 having the above-described configuration will be described. When a drive voltage is applied between the common electrode 18 and the pixel electrode 16 shown in FIGS. 4 and 5 and an electric potential difference is generated, an electric field having electric flux lines that come out from the upper side of the pixel electrode 16, pass through the slit 16a, and reach the upper side of the common electrode 18 is generated. At that moment, in the upper part of the pixel electrode 16, that is, a layer in which the liquid crystal layer 50 is disposed, an electric field (horizontal electric field) parallel to the glass substrate 11 is generated. In other words, the electric field has a component parallel to the glass substrate 11. The direction of the horizontal electric field is perpendicular to the longer side of the slit 16a. The liquid crystal molecules 51 included in the liquid crystal layer 50 changes their alignment direction in accordance with the strength of the horizontal electric field within a face parallel to the glass substrate 11.

Here, the rubbing directions 50a and 50b are parallel to the X-axis. The liquid crystal molecules 51 are aligned along the X-axis in the absence of an applied voltage or in an OFF state. The angle formed by the longer side of the slit 16a (FIG. 4) and the X-axis is about 5 degrees. Accordingly, the liquid crystal molecules 51 in the absence of an applied voltage or in an OFF state form an angle of about 5 degrees with respect to the longer axis of the slit 16*a*. As a result, the angle formed by the alignment direction of the liquid crystal molecules 51 in the absence of an applied voltage or in an OFF state and the direction (a direction perpendicular to the longer axis of the slit 16*a*) of the horizontal electric field applied in an ON state or the like is about 85 degrees. Accordingly, the rotation direction of the liquid crystal molecules 51 in a case where the horizontal electric field is applied can be configured to be constant. Thereby, the generation of a domain due to non-uniformity of the rotation direction can be suppressed.

Next, the display principle of the liquid crystal device 1 will be described with reference to FIG. 6. As described above, in an OFF state, the liquid crystal molecules 51 of the liquid crystal layer 50 are aligned along the rubbing directions 50*a* and 50*b* shown in FIG. 6. In such a case, since the polarization axis of the linearly polarized light transmitted through the polarizing plate 53 is perpendicular to the alignment direction of the liquid crystal molecules 51, the linearly polarized light passes through the liquid crystal layer 50 in a linearly polarized state without having a phase difference due to the liquid crystal layer 50 and is absorbed by the polarizing plate 55. Accordingly, in the OFF state, light for display does not pass through the polarizing plate 55, and thereby black display is performed.

On the other hand, in an ON state, the liquid crystal molecules 51 of the liquid crystal layer 50 is driven by the horizontal electric field, and the alignment direction thereof changes from the rubbing directions 50*a* and 50*b*. In such a case, since the polarization axis of the linearly polarized light transmitted through the polarizing plate 53 is not perpendicular to the alignment direction of the liquid crystal molecules 51, the linearly polarized light has a phase difference due to the liquid crystal layer 50, and thereby the polarization state thereof changes. The amount of a change in the polarization state depends on the retardation (in this embodiment, 0.37 μm) of the liquid crystal layer 50 and the rotation angle of the liquid crystal molecules 51. Since the light that passed through the liquid crystal layer 50 is not the linearly polarized light and has a component parallel to the transmission axis 55*a* of the polarizing plate 55, a part or the whole of the light passes through the polarizing plate 55 and is recognized by the observer's eyes. As described above, in the ON state, white display is performed.

On the other hand, when an intermediate voltage between the OFF voltage and the ON voltage is applied (that is, in an intermediate state between the ON state and the OFF state), the alignment direction of the liquid crystal molecules 51 changes by an angle corresponding to the magnitude of the voltage. Thus, the amount of change in the polarization state of the transmitted light in the liquid crystal layer 50 changes. Accordingly, the amount of light that passes though the polarizing plate 55 changes in correspondence with the magnitude of the applied voltage, and thereby half tone display is performed.

The above-described liquid crystal mode is called an FFS mode. In the FFS mode, the liquid crystal molecules are maintained to be approximately parallel to the glass substrate 11 all the time, thus the retardation changes little depending on the viewing angle, and thereby wide-viewing angle display can be performed.

The above-described operation is for a case where the transmission axes 53*a* and 55*a* of the polarizing plates 53 and 55 and the rubbing directions 50*a* and 50*b* are configured to be the optimal disposition. Actually, the transmission axes 53*a* and 55*a* may be deviated from a direction parallel or perpendicular to the rubbing directions 50*a* and 50*b* due to an error in bonding of the polarizing plates 53 and 55 or the like.

In descriptions below, an optical operation for such a case, and more particularly, the influence on the contrast of display will be described.

FIGS. 7A, 7B, 7C, and 7D are diagrams showing a relationship between the direction of the transmission axis 53*a* of the polarizing plate 53 and the polarization state of light after passing through the liquid crystal layer 50. In FIGS. 7A, 7B, 7C, and 7D, lower diagrams show the directions of the transmission axis 53*a* of the polarizing plate 53, and upper diagrams show the polarization state of light after passing through the polarizing plate 53 and the liquid crystal layer 50. Here, an OFF state is considered, and the liquid crystal molecules 51 are assumed to be aligned parallel to the X-axis. The reason why the OFF state (black display) is considered is that particularly luminance of black display has a great influence on the contrast of display.

FIG. 7D corresponds to a case where the optimal disposition is configured. As shown in the figure, when the transmission axis 53*a* is disposed to be parallel to the Y axis, the linearly polarized light transmitted through the polarizing plate 53 does not have a phase difference due to the liquid crystal layer 50, and accordingly, the light after passing through the liquid crystal layer 50 is in the same linearly polarized state. Accordingly, the light is absorbed by the polarizing plate 55 having the transmission axis 55*a* parallel to the X-axis, thus the low luminance of black display can be obtained, and thereby high contrast is acquired.

On the other hand, in FIGS. 7A to 7C, the transmission axis 53*a* is configured not to be parallel to the Y-axis, and more particularly, the transmission axis 53 is deviated in a negative direction (clockwise direction). This deviation is caused by irregularity of a bonding angle in a process for bonding the polarizing plate 53 or the like. In such a case, the linearly light transmitted through the polarizing plate 53 has the polarization axis not perpendicular to the liquid crystal molecules 51, and accordingly, a phase difference due to the liquid crystal layer 50 is generated. Accordingly, the light after passing through the liquid crystal layer 50 becomes an elliptical polarized light. As a result, even though the polarizing plate 55 is placed in any direction, the light has a polarized component parallel to the transmission axis 55*a* of the polarizing plate 55. Since the polarized component parallel to the transmission axis 55*a* passes through the polarizing plate 55, the luminance of black display increases, and thereby the contrast decreases. A configuration that can maximally prevent the decrease in the contrast is a configuration in which the transmission axis 55*a* of the polarizing plate 55 is perpendicular to the major axis of the ellipse of the elliptical polarized light.

Here, the direction of the major axis of the ellipse of the elliptical polarized light is determined by the retardation of the liquid crystal layer 50. When the retardation of the liquid crystal layer 50 is smaller than $3\lambda/4$ (that is, $0.75\lambda$), the major axis of the ellipse is deviated from the Y-axis in the positive direction (counterclockwise direction) (FIG. 7A). On the other hand, when the retardation of the liquid crystal layer 50 is the same as $3\lambda/4$, the major axis of the ellipse is parallel to the Y-axis (FIG. 7B). On the other hand, when the retardation of the liquid crystal layer 50 is larger than $3\lambda/4$, the major axis of the ellipse is deviated from the Y-axis by an angle in the negative direction (FIG. 7C). Here, $\lambda$ denotes a wavelength of incident light. $\lambda$ for a case where light having a wide range of wavelengths such as white light, for example, may be representatively denoted by 555 nm that shows the maximum visual sensitivity. Alternatively, $\lambda$ may be representatively denoted by a wavelength having the highest intensity within the visible light range.

Figure 8A:
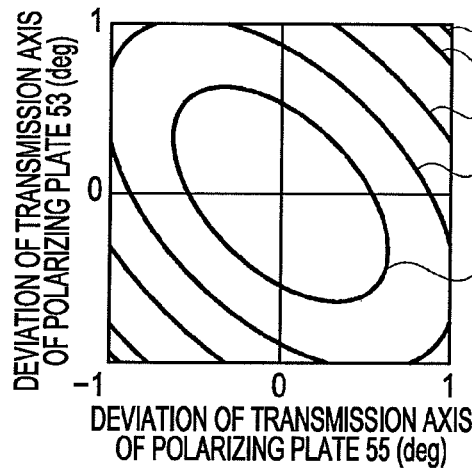
FIGS. 8A to 8E are graphs showing the contrast of the liquid crystal device in a case where the transmission axes of the polarizing plates are deviated from the optimal disposition in the range of ±1 degree.

When the retardation of the liquid crystal layer 50 is smaller than 3λ/4 (FIG. 7A), the major axis of the ellipse of the elliptical polarized light passing through the liquid crystal layer 50 is deviated from the Y axis in the positive direction. Accordingly, when the polarizing plate 55 is disposed such that the transmission axis 55a is deviated from the X-axis in the positive direction, the direction of the transmission axis 55a gets close to the direction of the minor axis of the ellipse. By using such a configuration, the amount of light passing through the polarizing plate 55 can be suppressed, and thereby high contrast can be acquired in an easy manner. On the contrary, when the transmission axis 55a is deviated from the X axis in the negative direction, the light passing through the polarizing plate 55 increases, and accordingly, the luminance of black display increases, and thereby the contrast decreases markedly. As described above, when the polarizing plates 53 and 55 are deviated in the same direction (for example, the negative direction), the contrast decreases markedly. On the other hand, when the polarizing plates 53 and 55 are deviated in the directions opposite to each other, respectively, (the positive direction and the negative direction), the decrease in the contrast can be suppressed. As a result, contrast distribution having a pattern, for example, as shown in FIG. 8A is acquired. FIGS. 8A to 8E are graphs showing the contrast of the liquid crystal device 1 in a case where the transmission axis 53a of the polarizing plate 53 and the transmission axis 55a of the polarizing plate 55 are deviated from the optimal disposition in the range of ±1 degree.

Figure 8B:
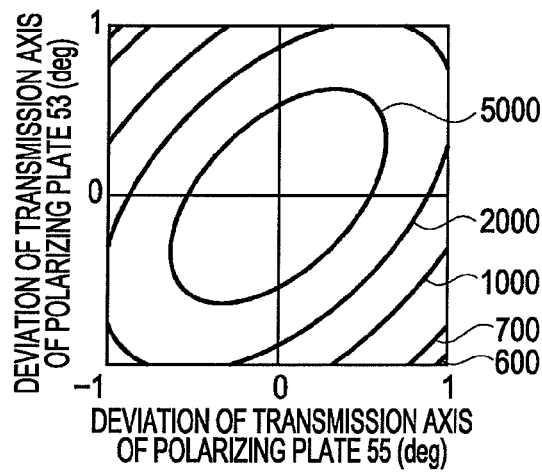
Figure 8C:
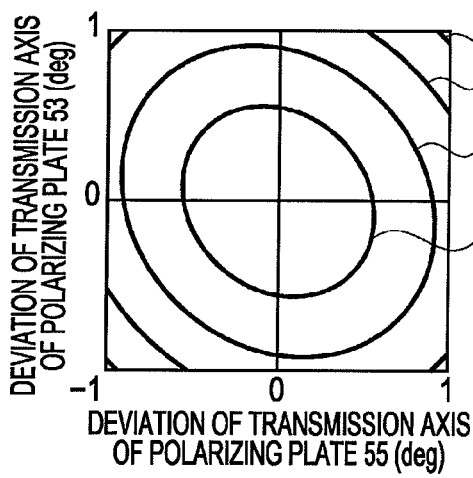
Figure 8D:
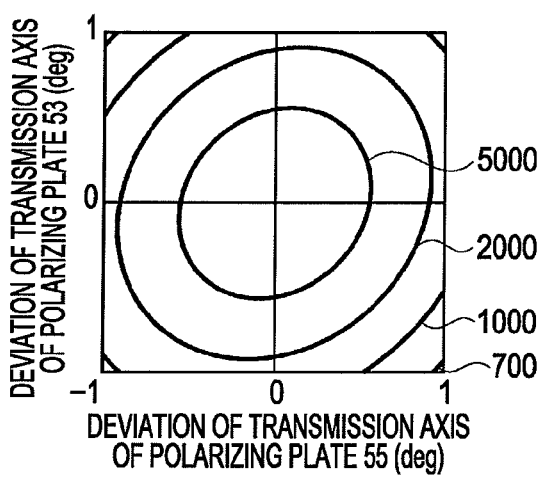
Figure 8E:
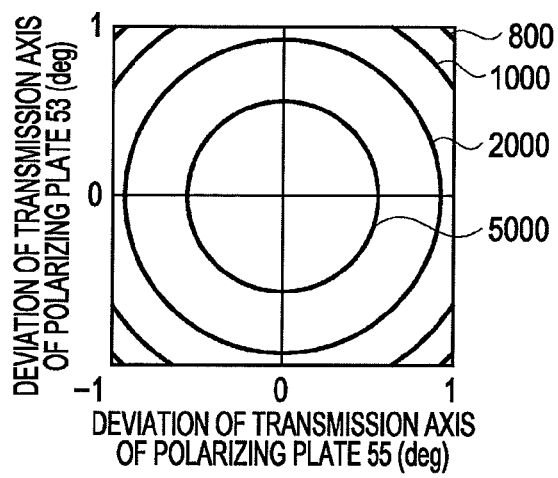

On the other hand, when the retardation of the liquid crystal layer 50 is the same as 3λ/4 (FIG. 7B), the major axis of the ellipse of the elliptical polarized light passing through the liquid crystal layer 50 is in accordance with the Y axis. Thus, when the polarizing plate 55 is disposed such that the transmission axis 55a becomes parallel to the X-axis, the direction of the transmission axis 55a is in accordance with the direction of the minor axis of the ellipse. In such a case, the amount of light passing through the polarizing plate 55 can be suppressed, and accordingly, high contrast can be acquired in an easy manner. In addition, even when the transmission axis 55a is deviated from the X-axis in any direction, the contrast decreases to the same degree. Accordingly, isotropic contrast distribution, for example, as shown in FIG. 8E is acquired.

On the other hand, when the retardation of the liquid crystal layer 50 is larger than 3λ/4 (FIG. 7C), the major axis of the ellipse of the elliptical polarized light passing through the liquid crystal layer 50 is deviated from the Y axis in the negative direction. Accordingly, when the polarizing plate 55 is disposed such that the transmission axis 55a is deviated from the X-axis in the negative direction, the direction of the transmission axis 55a gets close to the direction of the minor axis of the ellipse. In such a case, the amount of light passing through the polarizing plate 55 can be suppressed, and thereby high contrast can be acquired in an easy manner. On the contrary, when the transmission axis 55a is deviated from the X axis in the positive direction, the light passing through the polarizing plate 55 increases, and accordingly, the luminance of black display increases, and thereby the contrast decreases markedly. In other words, when the polarizing plates 53 and 55 are deviated in the directions opposite to each other, respectively, the contrast decreases markedly. On the other hand, when the polarizing plates 53 and 55 are deviated in the same direction, the decrease in the contrast can be suppressed. As a result, contrast distribution having a pattern, for example, as shown in FIG. 8B is acquired.

As described above, when the retardation of the liquid crystal layer 50 is different from 3λ/4, the sensitivity of the contrast change differs depending on whether the angles of the transmission axes 53a and 55a of the polarizing plates 53 and 55 deviate in the same direction or in the opposite directions. When the transmission axes 53a and 55a are deviated in a direction in which the sensitivity is high, that is, a direction in which the contrast changes rapidly, the contrast decreases markedly. Accordingly, in order to prevent such deviations of the transmission axes 53a and 55a, high mechanical precision is required in the process for bonding the polarizing plates 53 and 55. On the other hand, when the retardation of the liquid crystal layer 50 is the same as 3λ/4, the amount of change in the contrast does not depend on the directions of deviations of angles of the transmission axes 53a and 55a. Accordingly, it can be stated that the decrease in the contrast is small even when the bonding angles of the polarizing plates 53 and 55 deviate in any direction. In addition, even when the retardation of the liquid crystal layer 50 is different from 3λ/4, the dependency of the contrast change on the directions of deviations of the transmission axes 53a and 55a can be configured to be small by making the retardation to be close to 3λ/4. In other words, smaller difference in rapidity of the contrast change which depends on the directions of the deviations can be obtained.

As described above, it is preferable that the retardation of the liquid crystal layer 50 is close to 3λ/4. In this embodiment, the retardation of the liquid crystal layer 50 is set to 0.37 μm. This corresponds to approximate 0.66λ in a case where λ=555 nm. In such a case, the incident light to the liquid crystal device 1 becomes close to an elliptical polarized light having the major axis perpendicular to the alignment direction of the liquid crystal molecules 51 when the light has passed through the polarizing plate 53 and the liquid crystal layer 50. Accordingly, the dependency of the contrast change on the directions of the deviations of the angles of the transmission axes 53a and 55a can be suppressed to be low. In this embodiment, the dependence of the contrast on the deviations of the transmission axes 53a and 55a is as shown in FIG. 8A. As shown in the figure, the contrast higher than 600 can be obtained even when the transmission axes 53a and 55a are deviated within the range of ±1 degree.

In addition, generally, in the FFS-mode liquid crystal device, the retardation is frequently set to 0.65λ or less also for acquiring high transmission efficiency. However, in this configuration, the retardation of the liquid crystal layer is quite different from 3λ/4 (0.75λ), and thus when the angle of the polarization axis of the polarizing plate is deviated in the range of ±1 degree, the contrast may decrease rapidly depending on the direction of the deviation. In the above-described range of angles, the contrast may decrease down to a value equal to or smaller than 300 in some cases. In this embodiment, in order to prevent such a decrease in the contrast, the retardation is set to 0.66λ or a larger value.

Second Embodiment

Subsequently, a second embodiment of the invention will be described. A liquid crystal device 1 according to this embodiment is acquired by changing the retardation of the liquid crystal layer 50 according to the first embodiment, and other aspects according to this embodiment are common to the first embodiment. Hereinafter, the changed aspect will be mainly described.

In this embodiment, the refractive anisotropy Δn of the liquid crystal molecules 51 included in the liquid crystal layer 50 is 0.10, and the thickness d (FIG. 5) of the liquid crystal layer 50 is set to 4.6 μm. Accordingly, the retardation of the liquid crystal layer 50 which is defined as a value acquired from multiplying the refractive anisotropy Δn by the thickness d is 0.46 μm. This corresponds to about 0.83λ in a case where λ=555 nm. In such a case, the incident light to the liquid crystal device 1 becomes close to elliptical polarized light having its major axis perpendicular to the alignment direction of the liquid crystal molecules 51 when the incident light has passed through the polarizing plate 53 and the liquid crystal layer 50. Accordingly, the dependency of a change in the contrast on the deviated directions of the angles of the transmission axes 53a and 55a can be suppressed to be low. qqqqq The dependence of the contrast on the deviation of the transmission axes 53a and 55a according to the configuration of this embodiment is as shown in FIG. 8B. As shown in the figure, even when the transmission axes 53a and 55a are deviated in the range of ±1 degree, the contrast higher than 600 can be obtained.

Third Embodiment

Subsequently, a third embodiment of the invention will be described. A liquid crystal device 1 according to this embodiment is acquired by changing the retardation of the liquid crystal layer 50 according to the first embodiment, and other aspects according to this embodiment are common to the first embodiment.

In this embodiment, the refractive anisotropy Δn of the liquid crystal molecules 51 included in the liquid crystal layer 50 is 0.10, and the thickness d (FIG. 5) of the liquid crystal layer 50 is set to 3.9 μm. Accordingly, the retardation of the liquid crystal layer 50 which is defined as a value acquired from multiplying the refractive anisotropy Δn by the thickness d is 0.39 μm. This corresponds to about 0.70λ in a case where λ=555 nm. In such a case, the incident light to the liquid crystal device 1 becomes close to elliptical polarized light having its major axis perpendicular to the alignment direction of the liquid crystal molecules 51 when the incident light has passed through the polarizing plate 53 and the liquid crystal layer 50. Accordingly, the dependency of a change in the contrast on the deviated directions of the angles of the transmission axes 53a and 55a can be suppressed to be lower than that in the first embodiment. The dependence of the contrast on the deviations of the transmission axes 53a and 55a according to the configuration of this embodiment is as shown in FIG. 8C. As shown in the figure, even when the transmission axes 53a and 55a are deviated in the range of ±1 degree, the contrast higher than 700 can be obtained.

Fourth Embodiment

Subsequently, a fourth embodiment of the invention will be described. A liquid crystal device 1 according to this embodiment is acquired by changing the retardation of the liquid crystal layer 50 according to the first embodiment, and other aspects according to this embodiment are common to the first embodiment.

In this embodiment, the refractive anisotropy Δn of the liquid crystal molecules 51 included in the liquid crystal layer 50 is 0.10, and the thickness d (FIG. 5) of the liquid crystal layer 50 is set to 4.3 μm. Accordingly, the retardation of the liquid crystal layer 50 which is defined as a value acquired from multiplying the refractive anisotropy Δn by the thickness d is 0.43 μm. This corresponds to about 0.77λ in a case where λ=555 nm. In such a case, the incident light to the liquid crystal device 1 becomes close to elliptical polarized light having its major axis perpendicular to the alignment direction of the liquid crystal molecules 51 when the incident light has passed through the polarizing plate 53 and the liquid crystal layer 50. Accordingly, the dependency of a change in the contrast on the deviated directions of the angles of the transmission axes 53a and 55a can be suppressed to be lower than that in the first embodiment. The dependence of the contrast on the deviations of the transmission axes 53a and 55a according to the configuration of this embodiment is as shown in FIG. 8D. As shown in the figure, even when the transmission axes 53a and 55a are deviated in the range of ±1 degree, the contrast higher than 700 can be obtained.

Fifth Embodiment

Subsequently, a fifth embodiment of the invention will be described. A liquid crystal device 1 according to this embodiment is acquired by changing the retardation of the liquid crystal layer 50 according to the first embodiment, and other aspects according to this embodiment are common to the first embodiment.

In this embodiment, the refractive anisotropy Δn of the liquid crystal molecules 51 included in the liquid crystal layer 50 is 0.10, and the thickness d (FIG. 5) of the liquid crystal layer 50 is set to 4.2 μm. Accordingly, the retardation of the liquid crystal layer 50 which is defined as a value acquired from multiplying the refractive anisotropy Δn by the thickness d is 0.42 μm. This corresponds to about 0.75λ, that is, 3λ/4 in a case where λ=555 nm. In such a case, the incident light to the liquid crystal device 1 becomes elliptical polarized light having its major axis perpendicular to the alignment direction of the liquid crystal molecules 51 when the incident light has passed through the polarizing plate 53 and the liquid crystal layer 50. Accordingly, the amount of a change in the contrast does not depend on the deviated directions of the angles of the transmission axes 53a and 55a. The dependence of the contrast on the deviations of the transmission axes 53a and 55a becomes isotropic is as shown in FIG. 8E. Accordingly, when the bonding angles of the polarizing plates 53 and 55 are deviated in any direction, the decrease in the contrast is small. According to the configuration of this embodiment, even when the transmission axes 53a and 55a are deviated in the range of ±1 degree, the contrast higher than 778 can be obtained.

Sixth Embodiment

Although the liquid crystal devices 1 according to the above-described embodiments use the FFS mode, the invention is not limited thereto, and any mode may be used as long as the liquid crystal molecules 51 are driven by a horizontal electric field. This embodiment relates to a liquid crystal device 1 using the IPS mode from among such modes.

Figure 9:
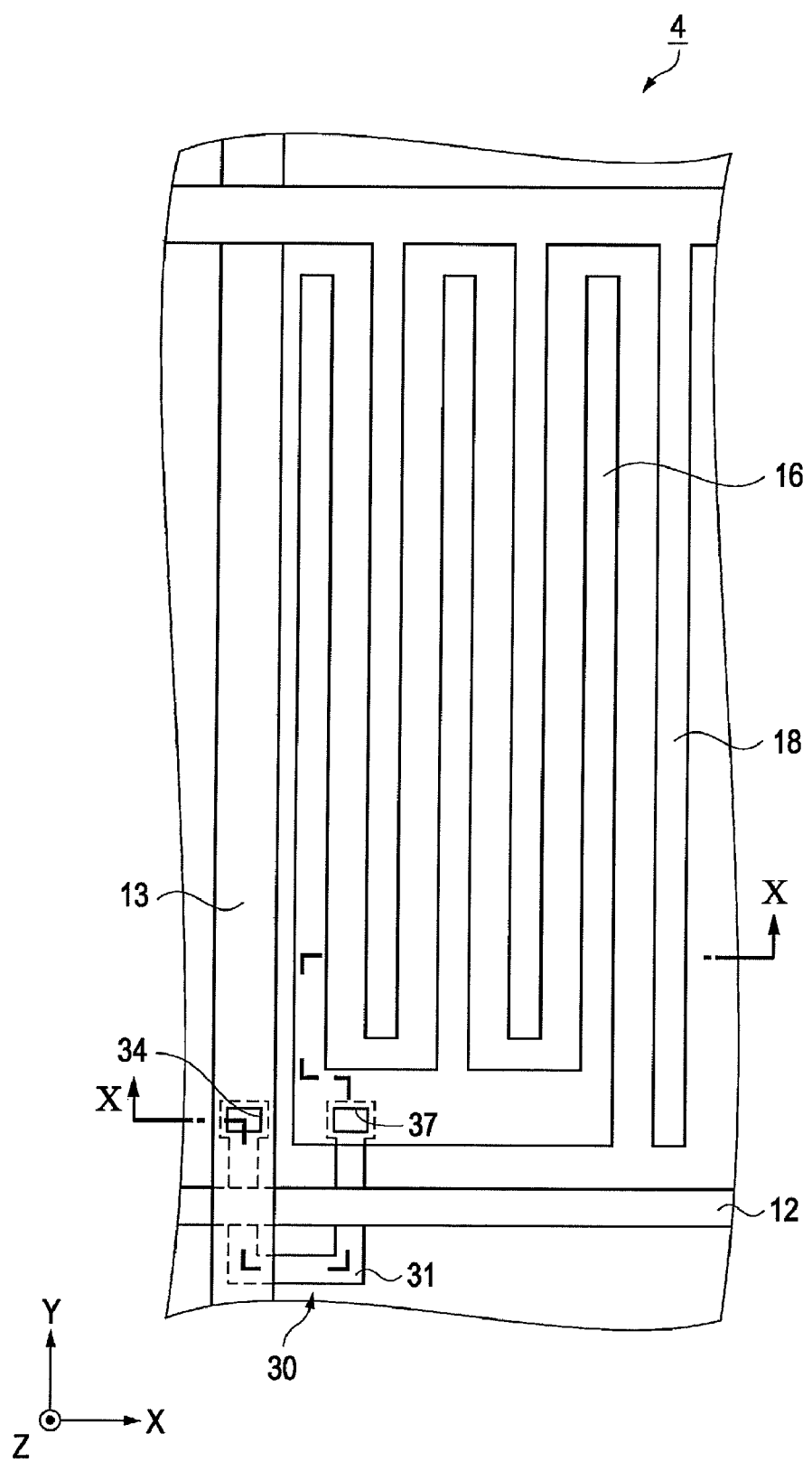
FIG. 9 is a plan view of a portion corresponding to one sub pixel which is extracted from a component substrate of a liquid crystal device using an IPS mode according to an embodiment of the invention.
Figure 10:
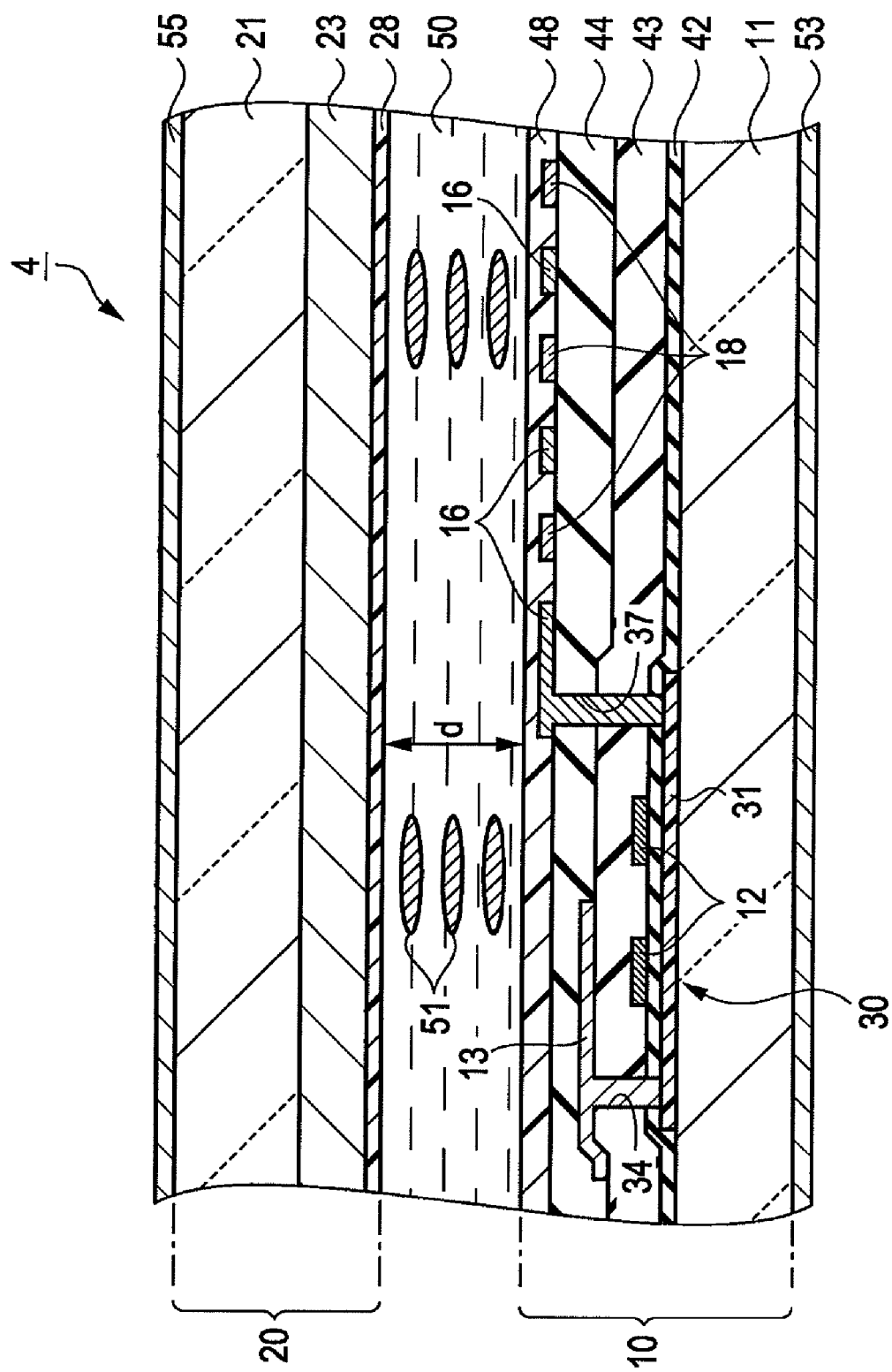
FIG. 10 is a cross-sectional view of FIG. 9 taken along line X-X.

FIG. 9 is a plan view of a portion corresponding to one sub pixel 4 which is extracted from a component substrate 10 of a liquid crystal device 1 using the IPS mode according to this embodiment. FIG. 10 is a cross-sectional view of FIG. 9 taken along line X-X. Hereinafter, descriptions of constituent elements of this embodiment which are common to those shown in FIGS. 4 and 5 will be omitted.

As shown in FIG. 9, both a common electrode 18 serving as a first electrode and a pixel electrode 16 that is electrically connected to a TFT element 30 and serves as a second electrode have portions in the shape of a comb-teeth. The common electrode 18 and the pixel electrode 16 are disposed to face each other such that the portions constituting the comb-teeth shape are alternated.

As shown in FIG. 10, on the surface, which faces the glass substrate 21, of the glass substrate 11, the TFT element 30 is formed. In an upper layer of the TFT element 30, a data line 13 is laminated with an interlayer insulation film 43 formed of a silicon oxide or the like interposed therebetween.

In an upper layer of the data line 13, the common electrode 18 and the pixel electrode 16 that are formed of ITO (indium tin oxide) having translucency are laminated with an interlayer insulation film 44 interposed therebetween. In other words, according to this embodiment, the common electrode 18 and the pixel electrode 16 are formed in a same layer. The pixel electrode 16 is electrically connected to a drain area of the TFT 30 through a contact hole 37 formed by perforating a gate insulation film 42 and interlayer insulation films 43 and 44. In the cross-section shown in FIG. 10, the comb-teeth shaped portions of the common electrode 18 and the pixel electrode 16 are disposed alternately.

On the common electrode 18 and the pixel electrode 16, an alignment film 48 formed of polyimide is laminated. The component substrate 10 includes from the glass substrate 11 to the alignment film 48 as its constituent elements.

The configuration of an opposing substrate 20, rubbing directions 50a and 50b of alignment films 28 and 48, the configurations of polarizing plates 53 and 55, the directions of transmission axes 53a and 55a, and the retardation and thickness d of the liquid crystal layer 50 are the same as those of the FFS-mode liquid crystal device 1 according to the above-described embodiments.

In the above-described configuration, while the common electrode 18 is maintained at a constant electric potential, an image signal is recorded in the pixel electrode 16 through the data line 13 and the TFT element 30, and accordingly, a drive voltage corresponding to the magnitude of the image signal is applied between the common electrode 18 and the pixel electrode 16. The drive voltage is set between an OFF voltage corresponding to black display and an On voltage corresponding to white display. When the drive voltage is applied and an electric potential difference is generated, an electric field having electric flux lines that come out from the surface of the pixel electrode 16 and reach the surface of the common electrode 18 is generated. Accordingly, in the upper parts of the common electrode 18 and the pixel electrode 16, that is, a layer in which the liquid crystal layer 50 is disposed, an electric field (horizontal electric field) parallel to the glass substrate 11 is generated. In other words, the electric field has a component parallel to the glass substrate 11. The direction of the horizontal electric field is perpendicular to the extending direction of the comb-teeth shaped electrodes of the common electrode 18 and the pixel electrode 16. The liquid crystal molecules 51 included in the liquid crystal layer 50 change their alignment directions in correspondence with the strength of the horizontal electric field within the face parallel to the glass substrate 11.

The above-described liquid crystal device 1 using the IPS mode performs display based on the same optical operation as that of the liquid crystal device using the FFS mode. When the retardation of the liquid crystal layer 50 is set to be equal to or larger than 0.66λ and be equal to or smaller than 0.83λ, the dependency of a change in the contrast on the deviated directions of angles of the transmission axes 53a and 55a can be suppressed to be low. On the other hand, when the retardation of the liquid crystal layer 50 is set to be equal to or larger than 0.70λ and be equal to or smaller than 0.77λ, the dependency of a change in the contrast on the deviated directions of angles of the transmission axes 53a and 55a can be suppressed to be lowered further. On the other hand, when the retardation of the liquid crystal layer 50 is set to 0.75λ, that is, 3λ/4, the amount of changes in the contrast can be configured to be independent from the direction of deviations of angles of the transmission axes 53a and 55a. In other words, when the bonding angles of the polarizing plates 53 and 55 are deviated in any direction, the decrease in the contrast is small.

Electronic Apparatus

Figure 11:
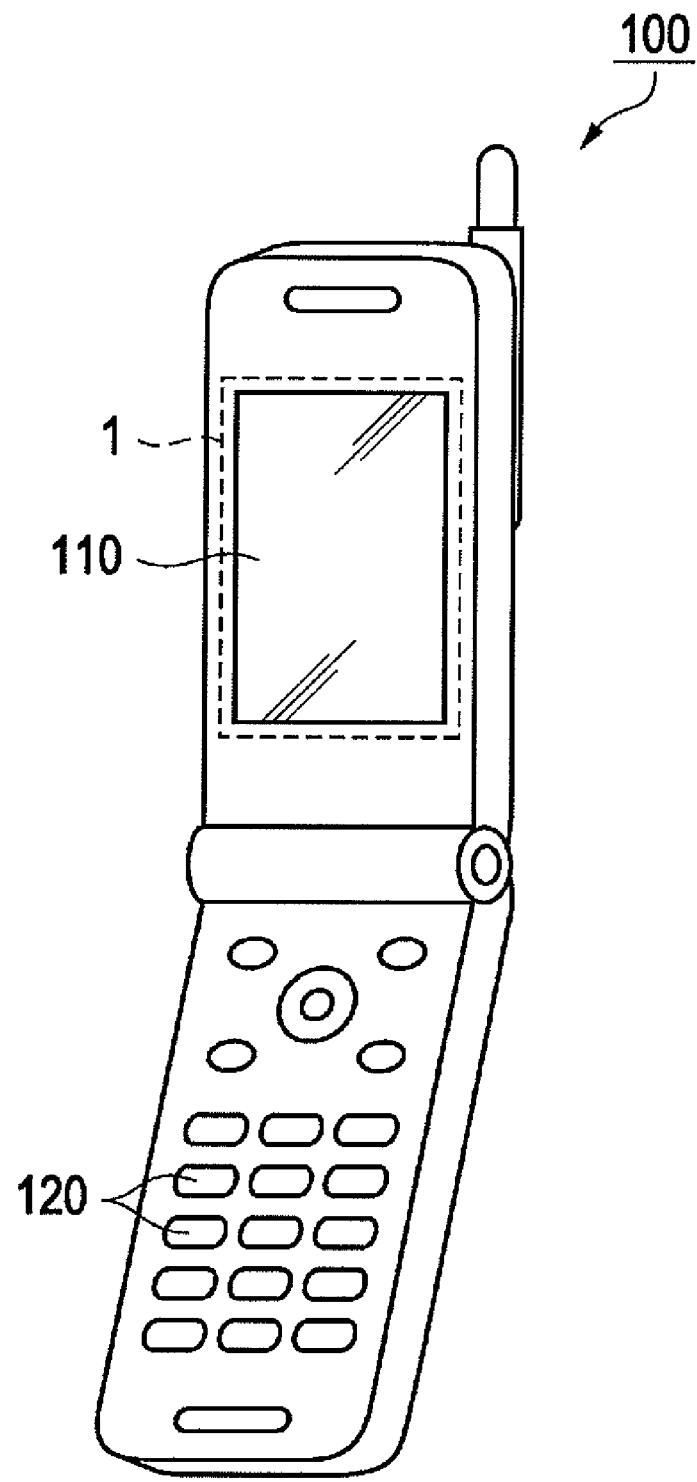
FIG. 11 is a perspective view of a cellular phone as an electronic apparatus according to an embodiment of the invention.

The above-described liquid crystal device 1, for example, may be mounted on an electronic apparatus such as a cellular phone for being used. FIG. 11 is a perspective view of a cellular phone 100 as an electronic apparatus according to an embodiment of the invention. The cellular phone 100 has a display unit 110 and operation buttons 120. The display unit 110 can display various types of information such as a content input by using the operation buttons 120 or incoming information with high contrast and a high display quality using the liquid crystal device 1 built therein.

In addition, the liquid crystal device 1 may be used in various electronic apparatuses such as a mobile computer, a digital camera, a digital camcorder, in-vehicle equipment, and audio equipment other than the cellular phone 100. In addition, the liquid crystal device 1 may be installed to a projector as a light valve.

In the above-described embodiments, various modifications can be made. As modified examples, the followings may be considered.

MODIFIED EXAMPLE 1

In the first and second embodiments, although the retardation of the liquid crystal layer 50 is configured to be 0.66λ and 0.83λ, however, the embodiments are not limited thereto. When the retardation of the liquid crystal layer 50 is in the range equal to or larger than 0.66λ and equal to or smaller than 0.83λ, the light passing though the liquid crystal layer 50 is close to elliptical polarized light having the major axis perpendicular to the alignment direction of the liquid crystal molecules 51. Accordingly, as in the first and second embodiments, the dependency of a change in the contrast on the deviated directions of angles of the axes 53a and 55a can be suppressed to be low. In such a case, when the transmission axes 53a and 55a are irregular in the range of ±1 degree, the lowest contrast can be suppressed to be equal to or larger than 600.

MODIFIED EXAMPLE 2

In the third and fourth embodiments, although the retardation of the liquid crystal layer 50 is configured to be 0.70λ and 0.77λ, however, the embodiments are not limited thereto. When the retardation of the liquid crystal layer 50 is in the range equal to or larger than 0.70λ and equal to or smaller than 0.77λ, the light passing though the liquid crystal layer 50 is approximately identical to elliptical polarized light having the major axis perpendicular to the alignment direction of the liquid crystal molecules 51. Accordingly, as in the third and fourth embodiments, the dependency of a change in the contrast on the deviated directions of angles of the axes 53a and 55a can be suppressed to be low. In such a case, when the transmission axes 53a and 55a are irregular in the range of ±1 degree, the lowest contrast can be suppressed to be equal to or larger than 700.

What is claimed is:
1. A liquid crystal device comprising:
a first substrate and a second substrate that are disposed to face each other;
a first electrode and a second electrode that are disposed on a surface, which faces the second substrate, of the first substrate;

a liquid crystal layer that is disposed between the first substrate and the second substrate and has liquid crystal molecules aligned in a direction parallel to the first substrate; and a pair of polarizing elements having the liquid crystal layer interposed therebetween, wherein the first electrode and the second electrode are adapted to generate an electric field having a component parallel to the first substrate when a potential difference exists between the first electrode and the second electrode, the electric field adapted to drive the liquid crystal molecules, the first electrode and the second electrode have portions forming comb-teeth shapes, that are formed in a same layer, and are disposed to face each other such that the portions forming the comb-teeth shapes are alternately disposed, a retardation of the liquid crystal layer is about 0.75λ for light having a wavelength λ of 555 nm, the retardation of the liquid crystal layer selected to produce a minimum loss of contrast independent of an accuracy of alignment of an orientation of the pair of polarizing elements, wherein the liquid crystal device has a contrast higher than 600 when the transmission axes of the polarizing elements are deviated up to a range of plus or minus 1 degree, and wherein when one or both of the polarizing elements are deviated, the contrast decreases to the at least substantially the same degree irrespective of the direction of deviation of the polarizing elements, and wherein when a first one of the polarizing elements is deviated up to a range of plus or minus 1 degree relative to a Y axis of a second one of the polarizing elements, the light passing through the liquid crystal layer is elliptically polarized light having a major axis which is parallel to the Y axis.

2. An electronic apparatus comprising the liquid crystal device according to claim 1.

3. A liquid crystal device comprising:

a first substrate and a second substrate that are disposed to face each other;

a first electrode and a second electrode that are disposed on a surface, which faces the second substrate, of the first substrate;

a liquid crystal layer that is disposed between the first substrate and the second substrate and has liquid crystal molecules aligned in a direction parallel to the first substrate; and a pair of polarizing elements having the liquid crystal layer interposed therebetween, wherein the first electrode and the second electrode are adapted to generate an electric field having a component parallel to the first substrate when a potential difference exists between the first electrode and the second electrode, the electric field adapted to drive the liquid crystal molecules, the first electrode is disposed between the second electrode and the liquid crystal layer, the first electrode comprising a plurality of through-holes, enclosed by the first electrode adapted to allow electric field from the second electrode to reach the liquid crystal layer, a retardation of the liquid crystal layer is about 0.75λ for light having a wavelength λ of 555 nm, the retardation of the liquid crystal layer selected to produce a minimum loss of contrast independent of an accuracy of alignment of an orientation of the pair of polarizing elements, wherein the liquid crystal device has a contrast higher than 600 when the transmission axes of the polarizing elements are deviated up to a range of plus or minus 1 degree, and wherein when one or both of the polarizing elements are deviated, the contrast decreases to the at least substantially the same degree irrespective of the direction of deviation of the polarizing elements, and wherein when a first one of the polarizing elements is deviated up to a range of plus or minus 1 degree relative to a Y axis of a second one of the polarizing elements, the light passing through the liquid crystal layer is elliptically polarized light having a major axis which is parallel to the Y axis.

4. The liquid crystal device according to claim 1, wherein a thickness of the liquid crystal layer is about 3.7 μm.

5. The liquid crystal device according to claim 1, wherein the refractive anisotropy of the liquid crystal molecules is about 0.10.

6. The liquid crystal device according to claim 1, wherein the liquid crystal device has a contrast higher than 700 when the transmission axes of the polarizing elements are deviated up to a range of plus or minus 1 degree.

7. The liquid crystal device according to claim 3, wherein a thickness of the liquid crystal layer is about 3.7 μm.

8. The liquid crystal device according to claim 3, wherein the refractive anisotropy of the liquid crystal molecules is about 0.10.

9. The liquid crystal device according to claim 3, wherein the liquid crystal device has a contrast higher than 700 when the transmission axes of the polarizing elements are deviated up to a range of plus or minus 1 degree.

* * * * *